(12) United States Patent
Lan et al.

(10) Patent No.: US 11,417,870 B2
(45) Date of Patent: Aug. 16, 2022

(54) SOLID STATE BATTERY AND METHOD FOR PRODUCING SAME

(71) Applicant: Forschungszentrum Juelich GmbH, Juelich (DE)

(72) Inventors: Tu Lan, Juelich (DE); Qianli Ma, Juelich (DE); Frank Tietz, Monschau (DE); Olivier Guillon, Juelich (DE)

(73) Assignee: FORSCHUNGSZENTRUM JUELICH GMBH, Juelich (DE)

( * ) Notice: Subject to any disclaimer, the term of this patent is extended or adjusted under 35 U.S.C. 154(b) by 0 days.

(21) Appl. No.: 17/420,146

(22) PCT Filed: Jan. 15, 2020

(86) PCT No.: PCT/DE2020/000004
§ 371 (c)(1),
(2) Date: Jul. 1, 2021

(87) PCT Pub. No.: WO2020/160719
PCT Pub. Date: Aug. 13, 2020

(65) Prior Publication Data
US 2022/0093910 A1 Mar. 24, 2022

(30) Foreign Application Priority Data
Feb. 6, 2019 (DE) ..................... 10 2019 000 841.3

(51) Int. Cl.
*H01M 4/00* (2006.01)
*H01M 4/139* (2010.01)
(Continued)

(52) U.S. Cl.
CPC ......... *H01M 4/139* (2013.01); *H01M 4/0407* (2013.01); *H01M 4/0471* (2013.01);
(Continued)

(58) Field of Classification Search
CPC .. H01M 4/139; H01M 4/0407; H01M 4/0471; H01M 10/054; H01M 10/0562;
(Continued)

(56) References Cited

U.S. PATENT DOCUMENTS 8,304,115 B1   11/2012 Petkov et al.
2009/0226790 A1  9/2009 Kanamura et al.
(Continued)

FOREIGN PATENT DOCUMENTS

DE   102015013155 A1   4/2017
WO   WO 2017116599 A2  7/2017

OTHER PUBLICATIONS

Atsushi Inoshi, et al., "A Single-Phase, All-Solid-State Sodium Battery Using $Na_{3-x}V_{2-x}Zr_x(PO_4)_3$ as the Cathode, Anode, and Electrolyte", Advanced Materials Interfaces, Dec. 23, 2016, pp. 1-16, vol. 4, issue 5, Wiley-VCH Verlag, Weinheim, Germany.
(Continued)

*Primary Examiner* — Nicholas P D'Aniello
(74) *Attorney, Agent, or Firm* — Leydig, Voit & Mayer, Ltd.

(57) ABSTRACT

Provided is a method for producing an electrode for a solid-state battery comprising providing a multilayer solid ceramic electrolyte that comprises at least one dense layer having a total ion conductivity of at least 1 mS/cm at 25° C. and at least one porous layer having continuous and open pores having an average pore diameter between 1 and 50 μm; providing an aqueous infiltration fluid comprising at least one organic additive that can be at least partially converted into carbon; introducing the aqueous infiltration fluid into the at least one porous layer of the multilayer solid ceramic electrolyte; and subjecting the multilayer solid ceramic electrolyte to a thermal treatment in the form of sintering in a reducing atmosphere at temperatures between
(Continued)

Two-layer solid electrolyte

Three-layer solid electrolyte

400° C. and 900° C., whereby the electrode material is synthesized from the precursor of the electrode material on the surface of the pores in situ.

20 Claims, 3 Drawing Sheets

(51) Int. Cl.
H01M 4/04 (2006.01)
H01M 10/054 (2010.01)
H01M 10/0562 (2010.01)
H01M 10/0585 (2010.01)

(52) U.S. Cl.
CPC ..... *H01M 10/054* (2013.01); *H01M 10/0562* (2013.01); *H01M 10/0585* (2013.01); *H01M 2300/0071* (2013.01); *H01M 2300/0094* (2013.01)

(58) Field of Classification Search
CPC ..... H01M 10/0585; H01M 2300/0071; H01M 2300/0094
See application file for complete search history.

(56) References Cited

U.S. PATENT DOCUMENTS

| | | | |
|---|---|---|---|
| 2009/0226816 A1 | 9/2009 | Yoshida et al. | |
| 2014/0287305 A1 | 9/2014 | Wachsman et al. | |
| 2018/0114977 A1* | 4/2018 | Sakamoto | H01M 4/1391 |
| 2018/0183094 A1 | 6/2018 | Ikejiri et al. | |
| 2018/0205112 A1* | 7/2018 | Thomas-Alyea | H01M 10/052 |
| 2018/0254521 A1 | 9/2018 | Ma et al. | |

OTHER PUBLICATIONS

Carlos Bernuy-Lopez, et al., "Atmosphere Controlled Processing of Ga-Substituted Garnets for High Li-Ion Conductivity Ceramics", Chemistry of Materials, May 23, 2014, pp. 3611-3617, vol. 26, issue 12, ACS Publications, Washington D.C., USA.

Eongyu Yi, et al., Superionically conducting β"-Al2O3 thin films processed using flame synthesized nanopowders", Journal of Materials Chemistry A, Jun. 6, 2018, pp. 12411-12419, vol. 6, issue 26, Royal Society of Chemistry, London, United Kingdom.

Masashi Kotobuki, et al., "Fabrication of all-solid-state rechargeable lithium-ion battery using mille-feuille structure of $Li_{0.35}Li_{0.55}TiO_3$", Journal of Power Sources, Dec. 2, 2010, pp. 6947-6950, vol. 196, Elsevier, Amsterdam, Netherlands.

Klaus Decken, "Sodium-air batteries: Researchers improve system stability", Energyload, <<https://energyload.eu/stromspeicher/forschung/natrium-luft-akkus-systemstabilitaet/>>, Dec. 5, 2016, pp. 1-3, Energyload, Berlin, Germany.

Andreas Pfeffer, "Sodium Solid State Accumulator: Powerful and safe batteries", Elektroniknet.de, <<https://www.elektroniknet.de/automotive/elektromobilitaet/leistungsfaehige-und-sichere-batterien.148219.htm>>I, Nov. 28, 2017, pp. 1-2, WEKA Fachmedian GmbH, Haar, Germany.

Qianli Ma, et al., "Scandium-Substituted $Na_3Zr_2(SiO_4)_2(PO_4)$ Prepared by a Solution-Assisted Solid-State Reaction Method as Sodium-Iion Conductors", Chemistry of Materials, Jun. 20, 2016, pp. 4821-4828, vol. 28, ACS Publications, Washington D.C., USA.

Nanoneophyte, "The Holy Grail of Energy Storage—Chemists at U of Waterloo Discover Key Reaction Mechanism for Sodium-Oxygen Battery", Genesis Nanotechnology, Inc. Blog, <<"The Holy Grail of Energy Storage"—Chemists at U of Waterloo Discover Key Reaction Mechanism for Sodium-Oxygen Battery « Genesis Nanotechnologyo and I o (wordpress.com)>>. May 29, 2015, pp. 1-4, Wordpress Foundation, San Francisco, USA.

Yaoyu Ren, et al., "Garnet-type oxide electrolyte with novel porous-dense bilayer configuration for rechargeable all-solid-state lithium batteries", Ionics, Jul. 15, 2017, pp. 2521-2527, vol. 23, Springer Link, Cham, Switzerland.

Takhito Suzuki, et al., "Stabilization of superionic conduction phase in $Li_3Sc_2(PO_4)_3$", Solid State Ionics, Jul. 21, 1997, pp. 27-33, vol. 104, Elsevier, Amsterdam, Netherlands.

F. E. Mouahid, et al., "Crystal chemistry and ion conductivity of the $Na_{1+x}Ti_{2-x}Al_x(PO_4)_3$ (0.0 < x < 0.9) NASICON series", Journal of Materials Chemistry, Oct. 30, 2000, pp. 2748-2753, vol. 10, Royal Society of Chemistry, London, United Kingdom.

Mustafa Goktas, et al., "Graphite as Cointercalation Electrode for Sodium-Ion Batteries: Electrode Dynamics and the Missing Solid Electrolyte Interphase (SEI)", Advanced Energy Materials, Feb. 22, 2018, pp. 1-11, vol. 8, issue 16, Wiley-VCH Verlag, Weinheim, Germany.

Zhizhen Zhang, et al., "A Self-Forming Composite Electrolyte for Solid-State Sodium Battery with Ultralong Cycle Life", Advanced Energy Materials, Oct. 31, 2016, pp. 1-11, vol. 7, issue 4, Wiley-VCH Verlag, Weinheim, Germany.

Prasant Kumar Nayak, et al., "From Lithium-Ion to Sodium-Ion Batteries: Advantages, Challenges, and Surprises", Angewandte Chemie International Edition, Jun. 19, 2017, pp. 102-120, vol. 57, issue 1, Wiley-VCH Verlag, Weinheim, Germany.

Peng Hui-Fen, et al., "Effect of Anion Substitution of $SiO_4^{4-}$ for $Li_3Sc_2(PO_4)_3$ Superion Conductor", Chinese Journal of Inorganic Chemistry, Oct. 2011, pp. 1969-1974, vol. 27, 10, Chinese Chemical Society, Beijing, China.

Andreas Rossbach, et al., "Structural and transport properties of lithium-conducting NASICON materials", Journal of Power Sources, Apr. 25, 2018, pp. 1-9, vol. 391, Elsevier, Amsterdam, Netherlands.

\* cited by examiner

SOLID STATE BATTERY AND METHOD FOR PRODUCING SAME

CROSS-REFERENCE TO PRIOR APPLICATIONS

This application is a U.S. National Phase application under 35 U.S.C. § 371 of International Application No. PCT/DE2020/000004, filed on Jan. 15, 2020, and claims benefit to German Patent Application No. DE 10 2019 000 841.3, filed on Feb. 6, 2019. The International Application was published in German on Aug. 13, 2020 as WO 2020/160719 under PCT Article 21(2).

FIELD

The present invention relates to a solid-state battery that can be operated at room temperature with high capacity yield and good cyclization properties, and to a method for producing such a solid-state battery.

BACKGROUND

Rechargeable batteries (secondary batteries or accumulators) nowadays play an important role in daily life. Among commercially available rechargeable batteries, lithium-ion batteries (LIBs) are widely used due to their high energy density and long life.

However, concern about the dwindling reserves of lithium resources and the rising costs of LIBs has increased greatly since the battery market has been growing strongly in recent years. Sodium-ion batteries (NIBs) have many similarities to LIBs and, due to the better availability of and lower costs for the sodium-containing raw materials, are considered a promising alternative that is particularly suitable for stationary applications, such as energy stores for wind or solar power plants.

In contrast to the aforementioned common lithium-ion batteries with a liquid electrolyte, solid-state batteries bank on a solid electrolyte, made of ceramic, for example, which makes them stable chemically and in terms of temperature. This avoids the risks resulting from the flammability of liquid electrolytes.

An inorganic, boron-containing electrolyte that allows sodium ions to circulate relatively freely but is not combustible in comparison to the liquid electrolytes in lithium-ion batteries is, for example, known for sodium-ion batteries.

Similarly to lithium-ion batteries, the "all-solid-state" design of the sodium-ion batteries, in which only solid materials are used, therefore is drawing increasingly more attention from the academic and industrial sectors. In principle, solid-state batteries can also store more energy than lithium-ion batteries.

By eschewing liquid in the batteries, solid-state batteries (all-solid-state) also have the advantages that they are not combustible and due to the dense ceramic membrane as separation of the electrode chambers no undesired material transport can take place. As a result, known cross-contaminations in lithium-ion batteries are prevented.

Furthermore, with an ideal design of the electrolyte and electrode materials, degradation of capacity due to interface reactions, in particular at the anode ("solid electrolyte interface formation" by reaction of graphite with liquid electrolyte in lithium-ion batteries), can be avoided.

Unlike conventional lithium-ion batteries, the new solid-state battery also manages largely without toxic or harmful substances as additives in liquid electrolytes.

However, the existing technology for producing solid-state lithium or solid-state sodium batteries (NSSBs) is still unsatisfactory. No commercialized solid-state sodium batteries exist to date, and most of the solid-state sodium batteries described in scientific journals can so far only be operated at temperatures above 65° C.

In a report[1] on the operation of solid-state sodium batteries at room temperature, a relatively high capacity decrease (80% loss after 10 cycles) and a low coulombic efficiency (less than 75% in the first cycle, less than 50% in the third cycle) are disclosed, although the current density for charge/discharge was rather low (5 A/cm$^2$).

The term "coulombic efficiency" (coulomb efficiency, charging efficiency) refers to the ratio of drawn ampere-hours to charged ampere-hours. Coulombic efficiency provides information about the charge losses of the battery during charging and discharging.

The two electrodes or at least one of the electrodes of solid-state sodium batteries have so far been produced by mechanically mixing electrode materials and electrolyte materials. The contact between the electrolyte in the form of a sodium-ion conductor and the solid electrode materials for solid-state sodium batteries is based on the limited intergranular interfaces of the two solid phases. This is in contrast to modern sodium-ion batteries with liquid electrolytes, which have a fully homogeneous contact between the liquid sodium-ion conductors and the electrode materials. The limited interface contact in solid-state sodium batteries is often damaged during charging and discharging when the volume of electrode materials changes due to the incorporation and extraction of sodium ions. This problem regularly leads to instability of the electrode structure, which is frequently observed in both solid-state lithium and solid-state sodium batteries.

In order to solve the problem, solid-state batteries must provide new electrodes in which the structural stability of the electrodes is not negatively affected during operation by expansion and shrinkage of energy storage materials.

Infiltration is, for example, a promising method for solving the aforementioned problem, e.g., by introducing nanometer-long electrode particles into the pores of the solid electrolyte using a suspension. In this case, the solid electrolyte used would be the mechanically supporting component of the battery cells, and the volume change of the electrode materials would take place in the pore space, which would not negatively influence the main ceramic structure of the electrodes and of the interfaces.

Infiltration itself is not a new method, in particular if nanometer-long electrode particles are used. It has already been extensively used in other electrochemical devices, such as solid-oxide fuel cells, solid-oxide electrolysis cells, and membrane separators, etc.

However, infiltration has not yet been successfully used in connection with the production of electrode materials for rechargeable sodium batteries.

From an article by M. Kotobuki et al.[2], for example, the production of a rechargeable lithium-ion battery having a three-dimensional ordered macroporous structure (3DOM) is known, in which first a millefeuille structure comprising $Li_{0.35}La_{0.55}TiO_3$ as an electrolyte is created, and wherein $LiMn_2O_4$ has been infiltrated into each of the two outer porous layers. First tests showed the basic suitability of such a battery at a working voltage of more than 1.0 V.

Furthermore, Y. Ren et al.[3] report regarding an infiltration in the production of electrode materials for lithium batteries with an $Li_7La_3Zr_2O_{12}$ (LLZO)-based electrolyte. Accordingly, a monolithically sintered tablet having a porous and a dense layer comprising an $Li_{6.75}La_3Zr_{1.75}Ta_{0.25}O_{12}$ (LLZTO) electrolyte material having aluminum is produced first. Into the porous $Li_{6.75}La_3Zr_{1.75}Ta_{0.25}O_{12}$ layer, $LiCoO_2$ is infiltrated as an active cathode material using a sol-gel method, and the dense layer is contacted with a metallic Li anode. However, the lithium-ion batteries produced there disadvantageously exhibit a high degradation (30% after 10 cycles) during charging and discharging and a rather low coulombic efficiency (34% for the first cycle, 60% for the second, 80% for the tenth cycle).

A possible reason for the overall unsatisfactory performance of the aforementioned rechargeable lithium battery could be the insufficient ion conductivity of the ceramic electrolyte used.

The best oxide ceramic for lithium ions[4] ($Li_{6.55}Ga_{0.15}La_3Zr_2O_{12}$ has a lithium ion conductivity of $1.3 \times 10-3$ S/cm at room temperature, while the conductivity of the best oxide ceramic for sodium ions, such as $Na_{3.4}Sc_{0.4}Zr_{1.6}Si_2PO_{12}$ (NASICON) from DE 102015013155 A1 or β''-aluminum oxide[5], is regularly much higher at 3 to $5 \times 10^{-3}$ S/cm. In addition, other ceramics, such as sulfides, thiophosphates, or even closo-boranes, also have good conductivity values.

FIG. 1 shows the total ion conductivity at 25° C. as a function of the composition for the mixture series $Na_{3+x}Zr_2(SiO_4)_{2+x}(PO_4)_{1-x}$ and $Na_{3+x}Sc_xZr_{2-x}(SiO_4)_2(PO_4)$. For both series, the highest conductivity results at x=0.4.

Furthermore, US 2014/0287305 A1 discloses a solid-state lithium battery in which the multilayer electrolyte has a porous region and a dense region, wherein the porous region has at least partially anode material or cathode material.

SUMMARY

In an aspect, provided is a method for producing an electrode for a solid-state battery, comprising the steps of: providing a multilayer solid ceramic electrolyte that comprises at least one dense layer and at least one porous layer, wherein the at least one dense layer has a total ion conductivity of at least 1 mS/cm at 25° C., and wherein the at least one porous layer has continuous and open pores having an average pore diameter between 1 and 50 μm; providing an aqueous infiltration fluid in which at least one precursor of an electrode material is present in dissolved form and which comprises at least one organic additive that can be at least partially converted into carbon; introducing the aqueous infiltration fluid with the at least one precursor of an electrode material into the at least one porous layer of the multilayer solid ceramic electrolyte; and subjecting the multilayer solid ceramic electrolyte to a thermal treatment in the form of sintering in a reducing atmosphere at temperatures between 400° C. and 900° C., whereby the electrode material is synthesized from the precursor of the electrode material on the surface of the pores in situ.

In an aspect, provided is a solid-state battery comprising a multilayer solid ceramic electrolyte, wherein the multilayer solid ceramic electrolyte comprises: at least one dense layer and a least one porous layer; wherein the at least one dense layer has a total ion conductivity of at least 1 mS/cm at 25° C.; wherein the at least one porous layer has continuous and open pores having an average diameter of less than 10 μm, and wherein active electrode material is arranged on the surface of the pores.

Advantageous embodiments of the method and of the electrode result from the respective claims referring thereto.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

The features of the different embodiments of this invention and their respective advantages are disclosed when reading the exemplary embodiments listed below in connection with the figures. The figures show.

DETAILED DESCRIPTION

Figure 1:
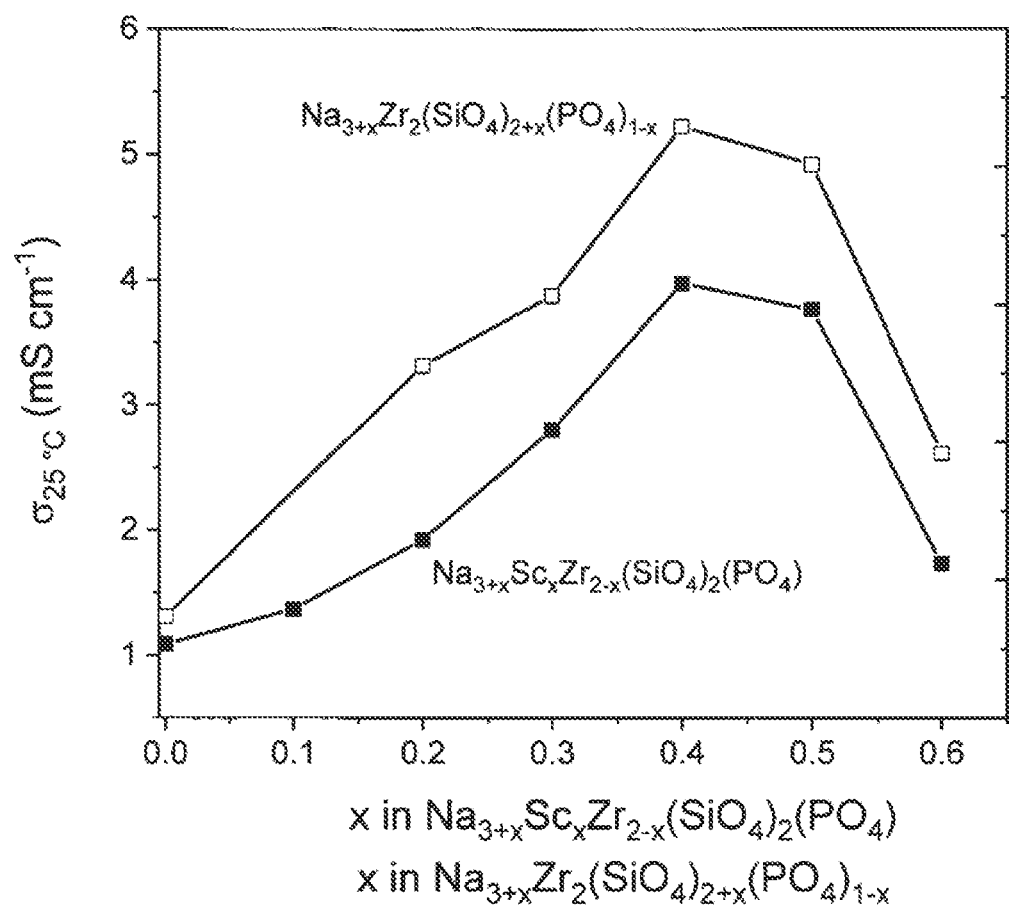
FIG. 1: representation of the total ion conductivity at 25° C. as a function of the composition for the mixture series $Na_{3+x}Zr_2(SiO_4)_{2+x}(PO_4)_{1-x}$ and $Na_{3+x}Sc_xZr_{2-x}(SiO_4)_2(PO_4)$.

An aspect of the invention provides an improved electrode for a solid-state battery which makes possible effective operation of the solid-state battery at room temperature, a high capacity yield, and good cyclization properties.

Furthermore, an aspect of the invention provides a production method for the aforementioned electrode.

In the context of the invention, it was found that infiltration can be a suitable means in the production of electrodes for rechargeable solid-state batteries. In the infiltration of nanoparticles of an active electrode material into a framework consisting of solid electrolyte (porous electrolyte layer) for producing an electrode, the main ceramic structure of this electrode is advantageously not negatively affected during charging/discharging. This can bring about a relatively high cycle stability during operation of a rechargeable solid-state battery comprising such an electrode.

Unlike what has been known to date, it is proposed in the method according to the invention for producing an electrode for a solid-state battery not to introduce already active electrode material in the form of nanoparticles into a porous solid electrolyte layer but to introduce, with the aid of an infiltration fluid, only a precursor of this electrode material deeply into the open pores of the solid electrolyte, and only subsequently to synthesize this precursor in situ into active electrode material, by a thermal treatment in the form of sintering in a reducing atmosphere (here, for example, Ar/2% $H_2$), said material then being preferably homogeneously distributed on the surface of the pores of the porous solid electrolyte layer.

The reducing atmosphere is necessary on the one hand to produce the cathode material in its reduced form or to bring the valence-changing cations contained therein into their low-valent variant (here, $V^{3+}$, but also applying to the stabilization of the cations $Fe^{2+}$, $Cr^{3+}$, $Mn^{2+}$, $Co^{2+}$).

On the other hand, according to the invention, the infiltration solution is designed such that organic additives (here, for example, ethylamine) can be converted to carbon, which advantageously leads to an increase in electronic conductivity, in particular when the cathode material is discharged and itself loses electronic conductivity. The addition of at least one organic additive (e.g., ethylamine) thus not only brings about better infiltration due to a strong reduction in the surface tension of the infiltration fluid but also serves as a necessary carbon source. Besides ethylamine, other water-soluble and easily reducible organic compounds, such as sugar derivatives, polyethers, polyalcohols, or porphyrins, can also be used as organic additives that can at least partially be converted to carbon.

The invention relates to the production of electrodes, in particular to the production of cathodes, the latter being suitable for use in solid-state batteries, e.g., lithium batteries, lithium/oxygen batteries, or sodium/oxygen batteries. However, the method according to the invention is also suitable for the production of anodes.

Figure 2:
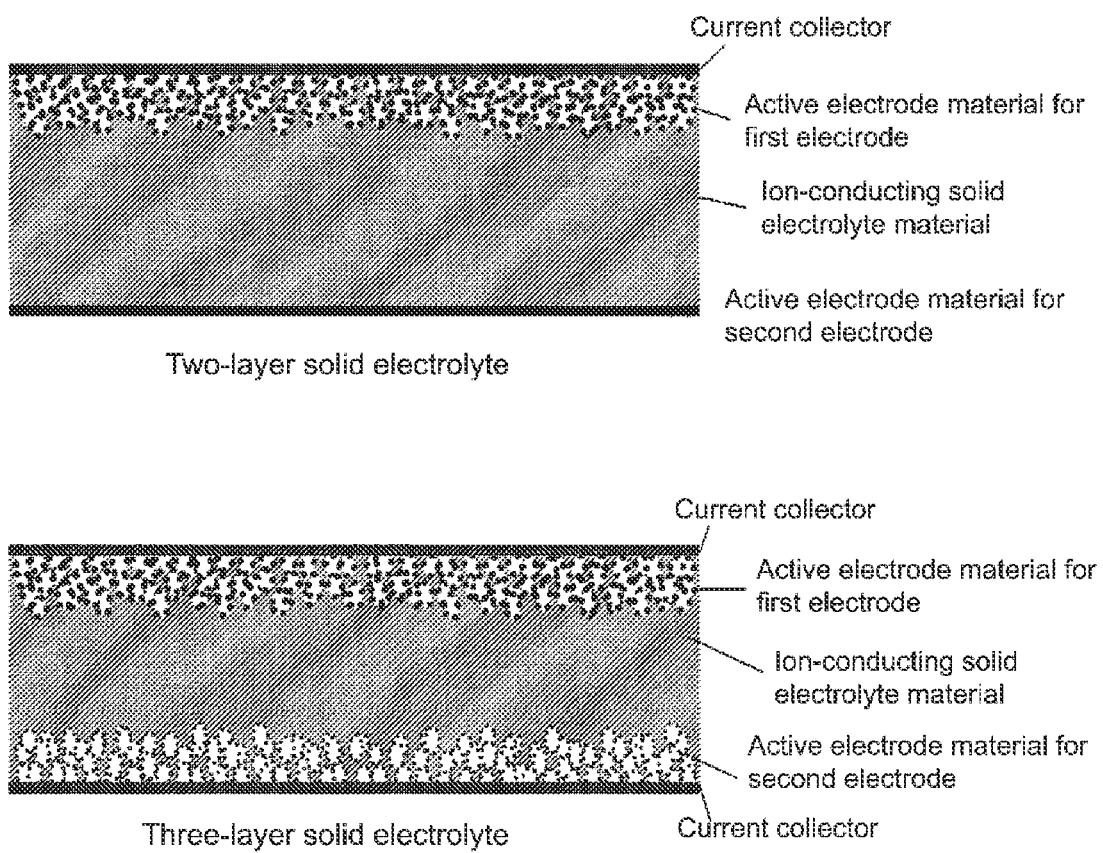
FIG. 2: schematic representation of a solid-state battery according to the invention; top: with a two-layer solid electrolyte having active electrode material within the pores of the porous layer, as well as current collector and second electrode, bottom: three-layer solid electrolyte having active electrode material in both the upper and the lower porous layers.

The schematic representation of a solid-state battery comprising at least one electrode according to the invention is shown in FIG. 2.

The first step of the production method according to the invention for an electrode of a solid-state battery is the provision of a multilayer solid-state electrolyte comprising at least one porous and at least one dense layer, wherein a layer having more than 95% of the theoretical density is referred to as a dense layer.

Such a solid ceramic electrolyte can be produced, for example, by sintering a corresponding green body made of selected electrolyte materials.

Both a two-layer system with one porous and one dense layer and a three-layer system with a middle dense and two further outer porous layers can be used as solid electrolyte for the method according to the invention.

In the case of a two-layer solid electrolyte with one porous and one dense layer, the porous layer is converted according to the invention into a cathode or into an anode, while the respective other electrode (anode or cathode) can, for example, later be arranged on the other side of the dense layer of the two-layer solid electrolyte in a final processing step during assembly of the battery.

If a three-layer solid electrolyte with a middle dense and two outer porous layers is used, the two outer porous layers can preferably be used directly for the production of an anode and a cathode.

The dense layer of the solid electrolyte preferably comprises, depending on the selected battery type, a Na-ion-conducting or Li-ion-conducting material having a high total ion conductivity at room temperature, which should advantageously be more than 1 mS/cm for Li-ion conductors and more than 3 mS/cm for Na-ion conductors but should not be less than 1 mS/cm. In the case of solid electrolytes, the "total ion conductivity" is composed of the proportions of ion conductivity in the grain interior and ion conductivity of the grain boundaries. Since the electronic conductivity is negligible, the term "conductivity" is often used as a synonym for "total ion conductivity" in the case of solid electrolytes.

The invention is explained below predominantly on the basis of a particular embodiment of the invention, in particular a sodium-ion solid-state electrode or sodium-ion solid-state battery, without being limited thereto.

Within the scope of his technical knowledge, the person skilled in the art will first think that the invention can easily be applied to solid-state electrodes or solid-state batteries having other alkali metal ions. However, a closer consideration shows that a simple analogy to the lighter and heavier homologs of sodium does not result. The aforementioned Na-ion conductors thus have electronic conductivities of up to 5 mS/cm, analogous compositions of lithium are as yet unknown, and similar compositions have very poor conductivity. In the systems $Li_{3-x}Sc_{2-x}Zr_x(PO_4)_3$[6] and $Li_{3+x}Sc_2(SiO_4)_x(PO_4)_{3-x}$[7], only electronic conductivities between $10^{-6}$ and $10^{-5}$ S/cm have been reported. Potassium compositions of this type are not known. However, lithium compounds with a NASICON structure are known and achieve the highest conductivities of $0.6$-$1.5*10^{-3}$ S/cm[8] at room temperature for $Li_{1+x}Al_xTi_{2-x}(PO_4)_3$ where $x=0.3$-$0.5$. In contrast, for $Na_{1+x}Al_xTi_{2-x}(PO_4)_3$, only values of approximately $10^{-7}$ S/cm are achieved[9], and analogous potassium compounds are insulators and do not crystallize in the NASICON structure.

It is also known with regard to electrode materials that the analogous Li and Na materials exhibit very different physical and (electro)chemical behavior[10e] so that it must be examined very carefully whether a known Li-containing material can also be used meaningfully as Na-containing variant and vice versa.

Possible and suitable Na-ion-conducting materials for the multilayer solid electrolyte are, for example, β-aluminum oxide ($Na_2O.11Al_2O_3$) or β''-aluminum oxide ($Na_2O.5Al_2O_3$), which often occur as a phase mixture (Na-β/β''-aluminum oxide), as well as sodium superionic conductors (NASICON) in the form of $A_{1+x+y}M'xM''_{2-x}(XO_4)_{3-y}(SiO_4)_y$, where $A=Na$; $M'=Hf$, $Zr$; $M''=La$—$Lu$ or $Sc$ or $Y$, and $X=P$ or $As$, and where $0<x<2$ and $0<y<3$. The designation La—Lu refers to the lanthanides La, Ce, Pr, Nd, Pm, Sm, Eu, Gd, Tb, Dy, Ho, Er, Tm, Yb, and Lu.

Effective Li-ion-conducting materials for the solid-state electrolyte provided are, for example, analogous ion conductors where $A=Li$; $M'=Ti$, $Ge$, $Hf$, $Zr$; $M''=Al$, $Ga$, $Sc$, $Y$, $La$—$Lu$, and $X=P$ or $As$.

Furthermore, granules come into consideration, such as $Li_{7-3x}M'xLa_3Zr_2M''YO_{12}$ where $M'=Al$, $Ga$, or $Li_{7-x}La_3Zr_{2-x}M''xO_{12}$ where $=Ta$, $Nb$, or perovskites, such as $Li_{0.35}La_{0.55}TiO_3$.

The porous layer of the solid electrolyte has continuous pores and through-pores and open pores so that the penetration of an infiltration fluid with good wetting properties into deep regions of this layer is made possible. To this end, the porous layer of the solid electrolyte has pores with an average pore diameter of approximately 1 to 50 μm.

The infiltration fluid is produced by dissolving in aqueous, inorganic or organic solutions the corresponding raw materials in the form of precursors of the desired cathode or anode material and, where appropriate, further additives. Suitable organic solutions include, for example, hydrocarbons, alcohols, esters, or ketones.

Possible and suitable cathode materials for solid-state sodium-ion batteries are oxides in the form of $Na_xMO_2$ where $M=Ni$, $Co$, $Mn$, $Fe$, $V$, $Cr$, or a combination of several of these aforementioned elements where $0<x<1$, phosphates (e.g., $Na_3V_2P_3O_{12}$, $Na_3Fe_2P_3O_{12}$, $Na_3Ti_2P_3O_{12}$, fluorophosphates (e.g., $Na_{1.5}VOPO_4F_{0.5}$, $Na_2FePO_4F$, and bimetal sulfates or bimetal silicates in the form of $Na_2M(SO_4)_2$ or $Na_2MSiO_4$ where $M=Fe$, $Co$, $Ni$, $V$, $Cr$, or a combination of several of these aforementioned elements.

In addition, small amounts of the metals M=Fe, Co, Ni, V, Cr, or a combination of several of these aforementioned elements may be replaced by substituents, such as Mg, in both the phosphates and the fluorophosphates.

The infiltration method of this invention can advantageously be applied to batteries having one of the aforementioned cathode materials.

Phosphates (e.g., $Na_3V_2P_3O_{12}$, $Na_3Fe_2P_3O_{12}$, $Na_3Ti_2P_3O_{12}$), bimetal sulfates or bimetal silicates in the form of $Na_2M(SO_4)_2$ or $Na_2MSiO_4$ where M=Fe, Co, Ni, V, Cr, or a combination of several of these aforementioned elements) and carbon are typical and suitable anode materials.

After a thermal treatment the selected precursor compounds that are used according to the invention in the infiltration fluid form the desired electrode material in situ, without thereby forming impurities or leaving residues of the precursor compounds.

In addition, the precursor compounds are sufficiently soluble in the selected organic or inorganic solvent. They are stably present next to one another in the infiltration fluid without reacting with the solvent, the possible additives, or the solid electrolyte material.

For the aforementioned suitable electrode materials, there are many different types of soluble precursors that can be used in the infiltration fluid. Only a few examples are listed below, wherein the Na in the examples can also be replaced by Li in each case.

Oxides, such as $Na_xMO_2$ where M=Co, Ni, Mn, Fe, V, Cr, etc., or a combination of more than one of these elements: for example, by dissolving NaOH and $CO_3O_4$ in water, a corresponding precursor can be produced that generates the cathode material $NaCoO_2$ in situ.

Phosphates, such as $Na_3V_2P_3O_{12}$, $Na_3Fe_2P_3O_{12}$, $Na_3Ti_2P_3O_{12}$, where appropriate also with substitution elements:
for example, by dissolving $NaH_2PO_4$ and $NH_4VO_3$ in a mixture of ethanolamine (stabilizer) and water, a corresponding precursor can be produced that generates the cathode material $Na_3V_2P_3O_{12}$ in situ.

Fluorophosphates, such as $Na_{1.5}VOPO_4F_{0.5}$, $Na_2FePO_4F$, where appropriate also with substitution elements:
for example, by dissolving $NaH_2PO_4$ and $NH_4VO_3$ and HF in a mixture of ethanolamine (stabilizer) and water, a corresponding precursor can be produced that generates the cathode material $Na_{1.5}VOPO_4F_{0.5}$ in situ.

Metallic sulfates, such as $Na_2M(SO_4)_2$ where M=Fe, Co, Ni, V, Cr, etc., or a combination of more than one of these elements:
for example, by dissolving $Na_2SO_4$ and $FeSO_4$ in water, a corresponding precursor can be produced that generates the cathode material $Na_2Fe(SO_4)_2$ in situ.

Metallic silicates, such as $Na_2MSiO_4$ where M=Fe, Co, Ni, V, Cr, etc., or a combination of more than one of these elements:
for example, by dissolving NaOH, tetraethyl orthosilicate, and Fe(II)acetate tetrahydrate in water, a corresponding precursor can be produced that generates the cathode material $Na_2FeSiO_4$ in situ.

The selected solvent for the infiltration fluid has a significant solubility for the selected precursor compounds. Significant solubility is given when the infiltration fluid has a proportion of 10 wt. % to 90 wt. % dissolved precursor compound of the active electrode material at room temperature.

In some starting materials, oligomerization of the complex anions can possibly occur, such as the formation of polyphosphoric acids or metaphosphoric acids, polysilicates, or polyvanadates, which can lead to sol or gel formation with turbidity of the infiltration fluid and finally to the formation of nanoparticles (1-50 nm). This is permissible within the meaning of the invention as long as these nanoparticles do not impede infiltration up to the boundary with the dense electrolyte layer. In such an infiltration fluid (suspension), the dispersion medium should stabilize, i.e., be able to float, a sufficient amount of nanoparticles (10-90 wt. %).

In addition, the selected solvent for the infiltration fluid should result in a stable solution with the precursor compounds, i.e., no sediment from starting chemicals, reaction products, or nanopartikels of the active electrode material should have formed over a period of several days. Insofar as the solvent alone cannot dissolve the precursor compounds in significant amounts, or the precursor compounds have dissolved but the infiltration fluid is not sufficiently stable, at least one stabilizer can optionally be added.

A suitable stabilizer can, for example, form a coordination complex with the precursor compound and thus lead to improved solubility of the precursor compound in the infiltration fluid. Stabilizers suitable for this purpose are, for example, organic chemicals, such as alkanolamines (aminoalcohols), ammonium salts, or carboxylic acids.

The selection of the optionally added stabilizer may here depend on the precursor material selected. For example, the addition of alkanolamides when vanadium-containing precursor compounds are used has proven to be very advantageous for stabilizing the infiltration fluid.

Another important property of the infiltration fluid is its good wettability with respect to the ion-conducting material of the multilayer electrolyte. A contact angle of <90° is advantageous in this case. The smaller the contact angle, the better the wettability and the easier the infiltration fluid can penetrate into the deepest regions in the through-pores of the solid electrolyte.

If required, i.e., for example, in order to set a contact angle of less than 90° for the infiltration medium with respect to the ion-conducting material of the multilayer electrolyte or in order to decrease even further a contact angle of less than 90°, at least one surfactant can therefore additionally be added in order to improve the wetting property of the infiltration fluid. The term "surfactant" here refers to an amphiphilic organic compound having both a hydrophobic and a hydrophilic group. Surfactants in this sense are, for example, alkanolamine, stearic acid, or ammonium salts. The addition of at least one surfactant to the infiltration fluid can advantageously optimize wettability and make infiltration faster and more effective.

Besides the aforementioned stabilizers and surfactants, the possible further additives according to the invention for the infiltration fluid also include materials that are able to form an electronically conductive phase after a thermal treatment of the solid electrolyte or of the selected electrode material.

If the solid electrolyte is thermally treated with the electrode precursors introduced into the porous layer, for example in a reducing atmosphere, and an organic solvent is used, the organic solvent can regularly form electronically conductive carbon, even after sintering, in the porous solid-electrolyte layer in which the electrode material is synthesized in situ, unless the organic solvent itself vaporizes 100%. This takes place regularly if, for example, high-boiling solvents, stabilizers, or surfactants are used. However, this may also occur when organic anions, which may be contained in the solution, are used.

In other cases, for example when water is used as solvent, the electronic conductivity of the electrode produced can also be ensured after the second thermal treatment by further electrically conductive additives to the infiltration fluid, such as powdered carbon or powdered metals.

In order to start the infiltration process, contact between the infiltration fluid and the porous layer of the solid electrolyte is necessary. This contact can be achieved, for example, by partially or completely immersing the solid electrolyte in the solution or by painting, pouring, dropping the solution onto the surface of the porous layer of the multilayer solid electrolyte, or by further typical infiltration methods.

If the infiltration fluid has good wettability with respect to the ion-conducting material of the solid electrolyte, for example at a contact angle <90°, infiltration regularly takes place automatically via capillary forces upon contact of infiltration fluid and porous electrolyte.

And even in cases where an infiltration fluid that would have a larger wetting angle is to be used where appropriate, an apparatus, e.g., a vacuum chamber with an air pump that can change the air pressure around the support, can, for example, improve the process of infiltration with respect to speed and quantity of the infiltration fluid. In this way, for example, the air is first pumped out of the pores of the electrolyte by reducing the air pressure, the infiltration fluid is applied and subsequently pressed into the pores by increasing the pressure.

If the desired amount of electrode materials cannot yet be introduced into the porous layer by a single infiltration, infiltration can preferably also be carried out multiple times in succession.

The porosity and the pore diameter of the solid electrolyte determine the maximum loading or the concentration of the solution, the amount per infiltration step.

A first thermal treatment, e.g., drying, can preferably be carried out between two infiltrations in order to fix the already infiltrated precursor compounds in the form of active electrode material on the pore surface. Here, the term "drying" refers to a thermal treatment at a maximum of 150° C.

After infiltration and, where appropriate, drying of the solvent, the produced electrode/solid electrolyte component is subjected to a further, second thermal treatment. In this case, a thermal treatment takes place at temperatures between 400° C. and 900° C. in order to bring about the in-situ synthesis of the electrode material and to form a pure phase of the electrode material on the surface of the pores.

The atmosphere and the temperature profile of the second thermal treatment are selected and optimized according to the properties of the electrode material used. For example, pure hydrogen, a mixture of hydrogen and argon, pure argon, air, or even pure oxygen can be used as the atmosphere.

For some cathode materials that have, for example, $Fe^{2+}$ or $V^{3+}$ cations, a reducing atmosphere is necessarily provided, while other cathode materials should better be thermally treated in an oxidizing atmosphere, such as air.

The electrochemical cell on the basis of the infiltrated solid electrolyte can now finally be assembled. When a three-layer solid electrolyte (porous/dense/porous) is used, the electrodes and the solid electrolyte will have already been produced by the infiltration according to the invention. When using a two-layer solid electrolyte, as a rule, only one electrode is generated by the infiltration according to the invention, while the other electrode can be produced by other methods, such as direct application of sodium metal.

The electrochemical cell can subsequently be conductively connected to a housing in the usual way. The electrochemical cell can now be arranged individually or as a stack as a functional battery.

The specific capacity, expressed in mAh/g, of the batteries produced by the present invention was more than 90% of the theoretical capacity in selected exemplary embodiments.

The degradation of the batteries could be reduced to less than 10% of the starting capacity at a charging/discharging rate of 0.1 C to 1.0 C in 100 cycles. The coulombic efficiency thus achieved was more than 99% after the first cycle.

It has been found that the batteries produced according to the invention have distinct advantages over the batteries known so far. This applies particularly to solid-state sodium batteries.

For example, they exhibit better performance than previous solid-state sodium batteries that can be operated at room temperature ([1]: 80% capacity loss after 10 cycles, coulombic efficiency less than 75%) and even than previous solid-state sodium batteries that are operated at 80° C. ([11]: 35% capacity loss after 40 cycles).

The present invention brings about obvious advantages in battery performance compared to solid-state batteries known so far. The advantageous mode of operation is based on an active contact between the solid electrolyte and the electrolyte materials, which leads to an uninterrupted electronic and ionic conduction path. The advantages result from the microstructure of the porous solid ceramic electrolyte and the electrode materials generated in situ on the surface of the pores.

According to the invention, the proposed infiltration fluid can penetrate better than before into the deep regions of the porous structure of the solid electrolyte and lead, on the one hand, to a very homogeneous distribution of the electrode material and, on the other hand, to a high material density of electrode material within the electrode thus generated.

In order to produce an electrode according to the invention for a rechargeable solid-state battery, it is proposed to first prepare a precursor of the active electrode material as a solution or, where appropriate, together with further additives as a suspension that on the one hand comprises the highest possible concentration of active electrode material precursor and on the other hand should have a high wettability of the ion conductor material of the solid electrolyte into which the infiltration fluid is infiltrated.

The solution with the active electrode material precursor is subsequently infiltrated into the porous part of a layered porous solid electrolyte. A first thermal treatment for drying the infiltration fluid and for fixing the electrode material precursor compounds in the pores follows. If necessary, these two steps may be repeated multiple times in order to introduce a sufficient amount of electrode material precursor compounds into the pores of the porous electrolyte.

Advantageously, the infiltrated electrode precursor material in the pores reaches the transition of the porous and the dense layer of the solid electrolyte.

Ideally, the electrode material precursor compounds can completely fill the pores.

In order to minimize the infiltration steps, an infiltration fluid of the highest possible concentration can preferably be used.

While the invention has been thoroughly described and illustrated in the preceding part of the application in a preferred embodiment, in particular on the basis of sodium-ion-conducting solid electrolytes and corresponding electrodes, the following description and figures are also to be regarded solely as an example, without being limited thereto.

It is to be assumed that a person skilled in the art himself would and could, within the scope of his technical knowledge, make further changes and modifications to the following claims, which are also covered by the scope of protection of the claims. In particular, further embodiments with any combinations of the mentioned features of individual exemplary embodiments are included in the scope of the invention.

In an advantageous embodiment of the invention, the multilayer solid electrolyte itself can also be produced.

In this case, the porous layer or the porous layers of the solid electrolyte preferably comprise the same Na-ion-conducting or Li-ion-conducting material as is present in the dense layer, and additionally a porogen.

A macromolecular organic compound that can generate continuous, i.e., through-pores and open pores having a suitable size of preferably less than 10 μm in diameter in the porous solid electrolyte layer can, for example, be used as the porogen.

The porosity should, on the one hand, be selected to be very high in order to arrange as much active electrode material as possible on the surface. On the other hand, a certain stability of the electrolyte must be ensured so that the electrolyte material for the porous layer will usually constitute 30 to 40% of the volume of the solid electrolyte.

Suitable compounds for a porogen are, for example: various types of starch, cellulose, and polymers that preferably form pores in the range of 0.5 to 50 mm.

In the selection of the raw materials for the solid electrolyte, the conductivity of the Na-ion-conducting or Li-ion-conducting material and the correct type of porogen, e.g., the particle form of the porogen, must particularly be kept in mind.

For example, it has been found that the $Li_7La_3Zr_2O_{12}$ (LLZO)-based electrolyte[1] already used in the literature does not have sufficiently high conductivity for solid-state lithium-ion batteries, in particular at the porosity present there, in order to be considered as an effective ion conductor within the meaning of this invention. In addition, the use of graphite as porogen in the aforementioned example resulted in only inadequate openness of the pores and thus in a reduction in the infiltration effect. In this respect, graphite is not suitable as a porogen within the meaning of this invention.

The green body of the solid electrolyte layers for the solid-state battery may be prepared by bringing together at least one dense and one porous electrolyte layer. Possible methods for this bringing together are, for example, the pressing together of two or more powder layers, the strip casting of at least two layers, and the screen printing of a layer onto an already existing layer.

The green body of the solid electrolyte layers can be sintered in an oxidizing atmosphere in accordance with the compaction temperature of the respective materials (800-1300° C.) in order to, on the one hand, compact the layer provided as an electrolyte layer and, on the other hand, remove the porogen from the at least one porous layer of the solid electrolyte, which later is to form an electrode, in order to thus form through-pores in the later electrode.

The quantity of porogen in the mixture is regularly between 10 and 90 vol. %. The preparation of the green body and the sintering can be optimized on the basis of the sintering properties of the ion-conducting material used. The aim should be to achieve a high density in the dense layer (above 95% of the theoretical density), a high porosity in the porous layer (20% to 80% of the volume), and a good connection between the two layers. This can be achieved, for example, by sintering.

In a preferred exemplary embodiment of the invention, a two-layer solid electrolyte comprising $Na_{3.4}Zr_2Si_{2.4}P_{0.6}O_{12}$ (NZSP) for a sodium battery is produced. To this end, NZSP powder as described, for example, in DE 102015013155 A1 can first be produced.

For the porous layer, NZSP powder is mixed with 10 wt. % rice starch, which serves as porogen, and ground in ethanol in a ball mill for 24 hours.

0.3 g of NZSP powder and 50 mg of the above produced mixture having a particle size between 1 and 2 μm are then placed in layers in a cylindrical press mold having a diameter of 13 mm and then compressed for 1.5 minutes into a green body by a press machine having a uniaxial force of 15 kN. The green body is then sintered at 1280° C. for 6 hours. A white, two-layer electrolyte pellet comprising $Na_{3.4}Zr_2Si_{2.4}P_{0.6}O_{12}$ with a dense and a porous layer is produced.

In this exemplary embodiment, $Na_3V_2(PO_4)_3$ (NVP) is selected as cathode material.

A mixture of $NH_4VO_3$ (NV), $NaH_2PO_4$ (NHP), and ethanolamine (EA) in water is produced for the infiltration fluid. NV and NHP thereby form the raw materials (precursor compounds) for the cathode material NVP. Ethanolamine (EA) serves on the one hand as a stabilizer and simultaneously acts as a surfactant. The weight ratio of EA, water, NV, and NHP is 1:2:0.46:0.71.

The infiltration of the prepared infiltration fluid then takes place in the porous region of the two-layer electrolyte pellet. To this end, the infiltration fluid is dripped onto the surface of the porous layer at a wetting angle of between 10 and 15°.

The process of infiltrating is repeated three times, wherein in each case a thermal treatment in the form of drying follows.

The electrolyte pellet is then subjected to a further, second thermal treatment. To this end, the electrolyte pellet is heated in an $Ar/H_2$ atmosphere to 730° C. for 3 hours in order to form the active cathode material $Na_3V_2(PO_4)_3$ (NVP) on the surface of the pores (in-situ synthesis).

The microstructure of the infiltrated porous layer of the solid electrolyte can then be checked, for example, via a scanning electron micrograph of the cross-section of the electrolyte pellet.

An NVP-NZSP sodium half-cell thus produced is provided with an additional electrode and assembled to form a solid-state sodium battery.

To this end, gold is first sputtered onto the porous surface of the multilayer electrolyte. The outer edge is then removed with sandpaper in order to prevent the occurrence of gold or carbon at the edge. The outer surface of the dense layer of the electrolyte is also polished with sandpaper.

The infiltrated multilayer electrolyte is subsequently transferred into an Ar-filled glovebox, in which a round piece of metallic sodium is pressed as an anode onto the dense layer of the electrolyte.

This cell is welded into a Swagelok battery housing.

Figure 3:
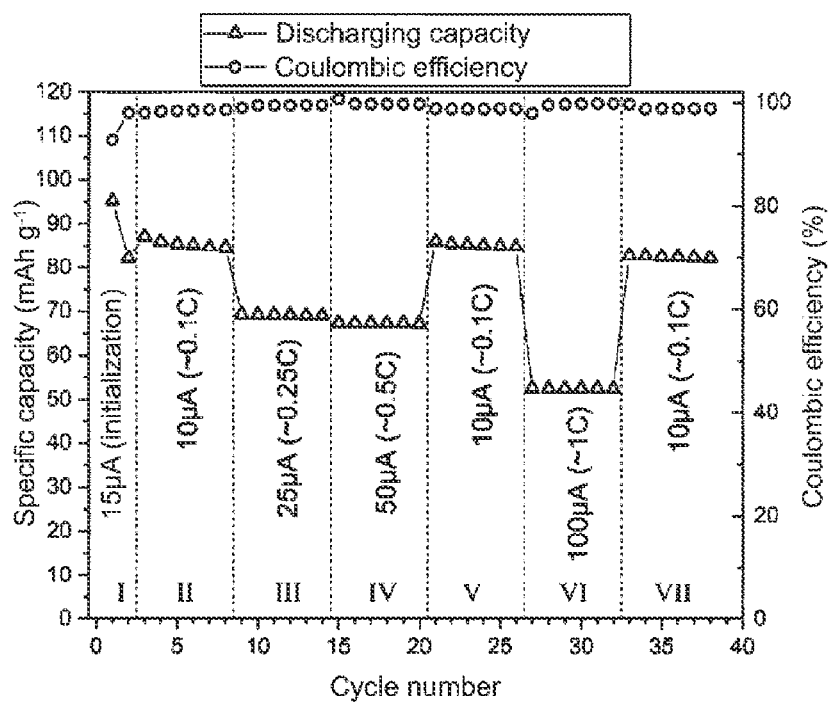
FIG. 3: representation of the cyclization properties of an NVP-NZSP-Na battery cell at 25° C. at different current densities: here, discharge capacities and coulombic efficiency of the individual cycles (40).
Figure 4:
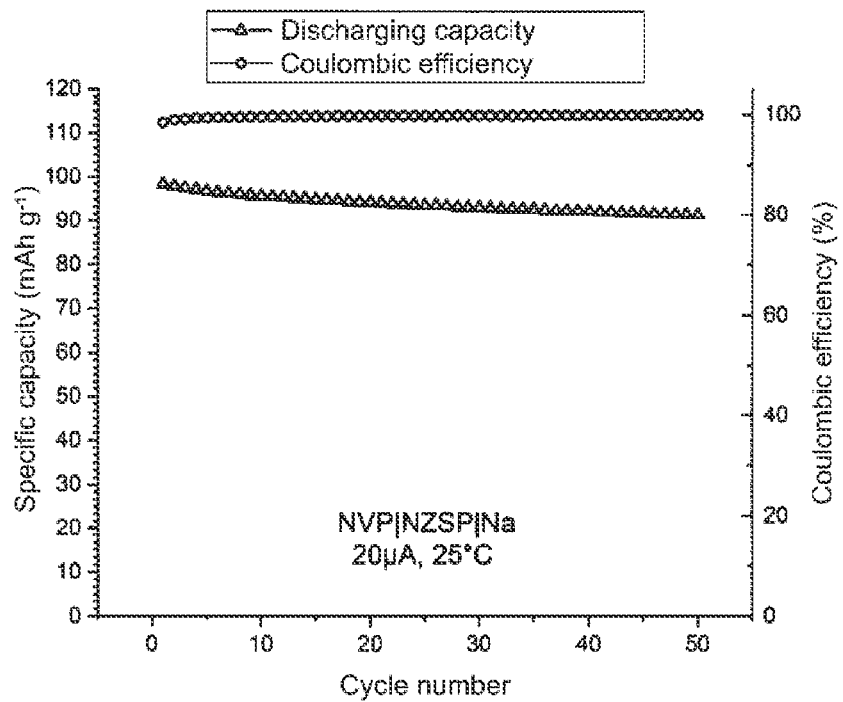
FIG. 4: representation of the cyclization properties of an NVP-NZSP-Na battery cell at 25° C. and a current density of 20 mA (0.1 C): here, discharge capacities and coulombic efficiency for the first 50 cycles.

The battery testing for the solid-state sodium-ion battery produced according to the invention was carried out using an electrochemical testing system. The NVP-NZSP-Na battery cell was charged at different current densities and discharged. The specific capacity measured for the first 40 cycles is shown in FIG. 3. Very low degradation can be seen.

For the conductivity measurements, the ground powders were introduced into a cylindrical press mold having a diameter of 8 to 13 mm and pressed at room temperature at a uniaxial pressure of 100 MPa. The pressed pellets were then sintered for 5 h at 1250° C. to 1300° C. The pellets obtained had a diameter of 6.5-10.5 mm and a thickness of approximately 1 mm.

The dense pellets were vapor-deposited on both sides with gold. The impedance spectra of the samples were measured at 25° C. using two commercially available electrochemical systems (Keysight E4991 B and Biologic VMP-300) with a frequency range of 3 GHz to 1 MHz and 3 MHz to 1 Hz, respectively. The results were calculated according to the size of the samples by multiplying by the conductive area and dividing by the thickness of the samples and adjusted using "Z-view" software (Scribner Associates Inc.). The temperature was controlled with the aid of a climate chamber (Votsch, VT4002).

CITED NON-PATENT LITERATURE

[1] Atsushi Inoishi, Takuya Omuta, Eiji Kobayashi, Ayuko Kitajou, Shigeto Okada, A Single-Phase, All-Solid-State Sodium Battery Using $Na_{3-x}V_{2-x}Zr_x(PO_4)_3$ as the Cathode, Anode, and Electrolyte, Adv. Mater. Interfaces 2017, 4, 1600942.
[2] Masashi Kotobuki, Hirokazu Munakata, Kiyoshi Kanamura, Fabrication of all-solid-state rechargeable lithium-ion battery using millefeuille structure of $Li_{0.35}La_{0.55}TiO_3$, Journal of Power Sources, Volume 196, Issue 16, 15 Aug. 2011, Pages 6947-6950.
[3] Yaoyu Ren, Ting Liu, Yang Shen, Yuanhua Lin, Ce-Wen Nan, Garnet-type oxide electrolyte with novel porous-dense bilayer configuration for rechargeable all-solid-state lithium batteries, Ionics 2017. 23(9): pages 2521 to 2527, https://doi.org/10.1007/s11581-017-2224-5.
[4] Carlos Bernuy-Lopez William Manalastas Jr. Juan Miguel Lopez del Arno, Ainara Aguadero, Frederic Aguesse, John A. Kilner, Atmosphere Controlled Processing of Ga-Substituted Garnets for High Li-Ion Conductivity Ceramics,
Chem. Mater., 2014, 26, pages 3610 to 3617, DOI: 10.1021/cm5008069.
[5] Eongyu Yi, Eleni Temeche, Richard M. Laine, Superionically conducting $\beta''$-$Al_2O_3$ thin films, processed using flame synthesized nanopowders, J. Mater. Chem. A, 2018, 6.1241, DOI: 10.1039/c8ta02907e.
[6] T. Suzuki, K. Yoshida, K. Uematsu, T. Kodama, K. Toda, Z.-G. Ye, M. Sato, Solid State Ionics 104 (1997) 27-33.
[7] H. F. Peng, M. L. Gao, M. F. Wang, C. X. Chen, Chin. J. Inorg. Chem. 27 (2011) 1969-1974.
[8] A. Rossbach, F. Tietz, S. Grieshammer, Journal of Power Sources 391 (2018) 1-9.
[9] F. E. Mouahid, M. Bettach, M. Zahir, P. Maldonado-Manso, S. Bruque, E. R. Losilla, M. A. G. Aranda, J. Mater. Chem. 10 (2000) 2748-2753.
[10] P. Kumar Nayak, L. Yang, W. Brehm, Ph. Adelhelm, Angew. Chem. [Applied Chemistry]—Int. Ed. 57 (2018) 102-120; and M. Goktas, Ch. Bolli, E. J. Berg, P. Novak, K. Pollok, F. Langenhorst, M. von Roeder, O. Lenchuk, D. Mollenhauer, Ph. Adelhelm, Adv. Energy Mater. 8 (2018) 1702724.
[11] Yan Zhang, Chiwei Wang, Hongshuai Hou, Guoqiang Zou, Xiaobo Ji, Sodium-Ion Batteries: Nitrogen Doped/Carbon Tuning Yolk-Like $TiO_2$ and Its Remarkable Impact on Sodium Storage Performances, Adv. Energy Mater. 2017, 7(4): 1601196.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for producing an electrode for a solid-state battery, comprising the steps of:
   providing a multilayer solid ceramic electrolyte that comprises at least one dense layer and at least one porous layer,
   wherein the at least one dense layer has a total ion conductivity of at least 1 mS/cm at 25° C., and
   wherein the at least one porous layer has continuous and open pores having an average pore diameter between 1 and 50 µm;
   providing an aqueous infiltration fluid comprising (1) at least one precursor of an electrode material in dissolved form, and (2) at least one organic additive that can be at least partially converted into carbon, wherein the at least one organic additive comprises ethylamine, a sugar derivative, a polyether, a polyalcohol, or a porphyrin;
   introducing the aqueous infiltration fluid with (1) the at least one precursor of an electrode material and (2) the at least one organic additive into the at least one porous layer of the multilayer solid ceramic electrolyte; and
   subjecting the multilayer solid ceramic electrolyte to a thermal treatment in the form of sintering in a reducing atmosphere at temperatures between 400° C. and 900° C.,
   whereby the electrode material is synthesized from the precursor of the electrode material on the surface of the pores in situ.

2. The method according to claim 1, wherein the infiltration fluid comprises an inorganic solution comprising $CS_2$, and wherein the organic addtive comprises alcohols, esters, or ketones.

3. The method according to claim 1, wherein the infiltration fluid further comprises at least one stabilizer.

4. The method according to claim 1, wherein the infiltration fluid further comprises at least one stabilizer comprising alkanolamine, carboxylic acids, or ammonium salts and/or a surfactant.

5. The method according to claim 1, wherein the infiltration fluid further comprises at least one electron-conducting material.

6. The method according to claim 1, wherein the multilayer solid ceramic electrolyte comprises a sodium-ion-conducting solid electrolyte comprising
β-$Na_2O$-11$Al_2O_3$ or
β"-$Na_2O$-5$Al_2O_3$ or
a sodium superionic conductor in the form of $A_{1+x+y}M'_xM''_{2-x}(XO_4)_{3-y}(SiO_4)_y$, where A=Na, M'=Hf, Zr, M''=La-Lu or Sc or Y, and X=P or As, and 0<x<2 and 0<y<3.

7. The method according to claim 1, wherein the multiplayer solid ceramic electrolyte comprises a sodium-ion-conducting solid electrolyte having a total ion conductivity of at least 3 mS/cm at 25° C.

8. The method according to claim 1, wherein the at least one porous layer has continuous and open pores having an average diameter of less than 10 μm.

9. The method according to claim 1, wherein the at least one precursor of the electrode material comprises oxides, phosphates, fluorophosphates, metallic sulfides, or metallic silicates, and wherein the electrode material comprises a cathode material.

10. The method according to claim 1, wherein the at least one precursor of the electrode material comprises phosphates or bimetal sulfates, and wherein the electrode material comprises an anode material.

11. The method according to claim 1, wherein the at least one precursor of the electrode material is used at a proportion of 30 to 40 wt. % in the infiltration fluid.

12. The method according to claim 1, comprising introducing the infiltration fluid with the at least one precursor of the electrode material multiple times in succession into the at least one porous layer of the multilayer solid ceramic electrolyte and dried before the multilayer solid ceramic electrolyte is subjected to thermal treatment at temperatures between 400° C. and 900° C.

13. The method according to claim 1, wherein the method produces a solid-state battery comprising a multilayer solid ceramic electrolyte, wherein the multilayer solid ceramic electrolyte comprises:
at least one dense layer and a least one porous layer;
wherein the at least one dense layer has a total ion conductivity of at least 1 mS/cm at 25° C.;
wherein the at least one porous layer has continuous and open pores having an average diameter of less than 10 μm, and
wherein active electrode material is arranged on the surface of the pores.

14. The method according to claim 13, wherein the multilayer solid ceramic electrolyte comprises a sodium-ion-conducting solid-state electrolyte comprising at least one dense layer having a total ion conductivity of at least 3 mS/cm at 25° C.

15. The method according to claim 1, wherein the at least one organic additive reduces a surface tension of the aqueous infiltration fluid.

16. The method according to claim 1, wherein the at least one organic additive comprises ethylamine.

17. The method according to claim 1, wherein the at least one organic additive comprises a sugar derivative.

18. The method according to claim 1, wherein the at least one organic additive comprises a polyether.

19. The method according to claim 1, wherein the at least one organic additive comprises a polyalcohol.

20. The method according to claim 1, wherein the at least one organic additive comprises a porphyrin.

* * * * *